Patented Feb. 21, 1928.

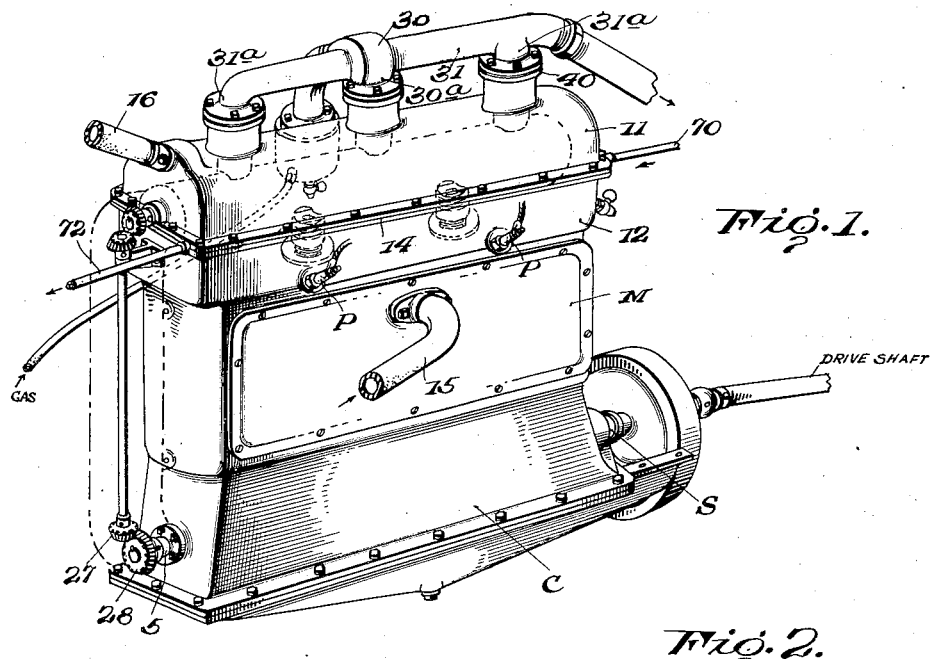
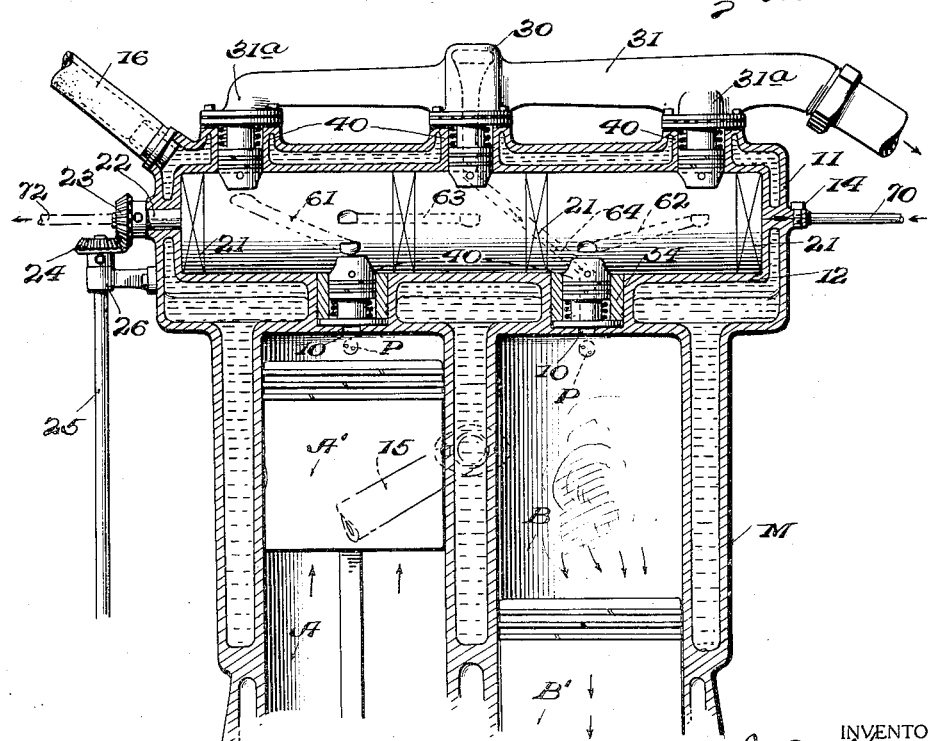

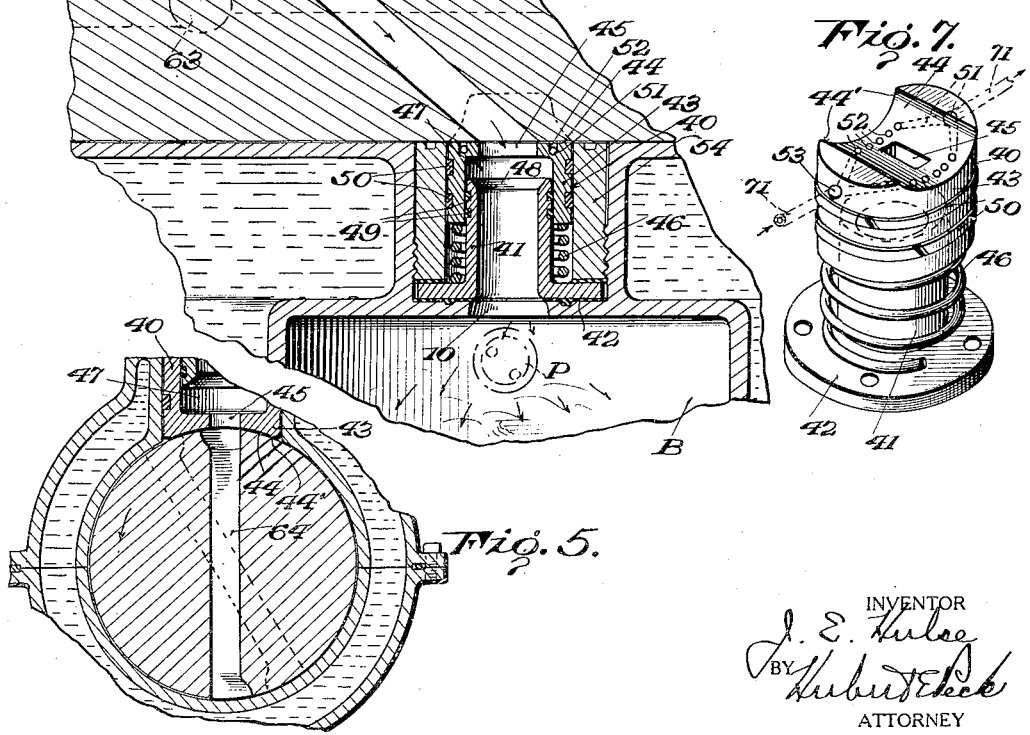

1,660,166

UNITED STATES PATENT OFFICE.

JAMES E. HULSE, OF OXFORD, NORTH CAROLINA, ASSIGNOR OF ONE-SIXTH TO JOHN HENRY NELMS, ONE-SIXTH TO ALBERT HENRY TAYLOR, AND ONE-SIXTH TO RUSSELL CARROLL PARHAM, ALL OF OXFORD, NORTH CAROLINA.

ROTARY VALVE MECHANISM.

Application filed June 6, 1927. Serial No. 196,898.

This invention relates to certain improvements in rotary valve mechanisms; and the nature and objects of the invention will be readily recognized and understood by those skilled in the arts involved in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

More specifically the invention deals with and is directed to the practical elimination of certain difficulties and the overcoming of certain serious problems and disadvantages inherent in and encountered with those broad, general types of rotary valves for internal combustion motors, characterized by a rotary valve forming member or shaft having a series of ports or passages therethrough for cooperation with the motor cylinder ports, by timed rotation of the valve member from the motor, to register or aline the valve passages with the cylinder ports in the required sequence or order, and permit supply of fuel charges to and discharge or exhaust from the cylinders through the valve member ports or passages. With these general types or rotary valves, among the main problems and difficulties encountered in operation and use, are those of effectively and practically sealing the rotary valve member or shaft with its passages and the motor cylinders with their ports, against leakage and loss of compression, as well as sealing against entry and mixing of lubricating oil for the valve member to and with the fuel charges on intake strokes, and against discharge and dissipation of oil on exhaust strokes of the motor; positively sealing the valve member under any and all conditions to which subjected in operation occasioned by temperature changes, unequal expansion and contraction in the member, and such like variable conditions, without binding, freezing or breakage and without material friction; positively and efficiently lubricating the valve member and sealing means; and effectively cooling the valve member and sealing means under all conditions of operation.

A general object of the present invention, therefore, is to provide a rotary valve mechanism of the foregoing broad, generic types, in which the above referred to problems, difficulties, and disadvantages, from among various others, are substantially eliminated and practically overcome, in a mechanically efficient and structurally simple manner.

A further object of the invention is to provide effective and efficient sealing means for a rotary valve member or shaft by which high compression and high speed can be maintained and developed in a motor through the medium of sealing means which is so designed and arranged as to continuously and automatically maintain sealing position, while employing or utilizing the compression developed in the motor cylinders on the compression strokes thereof to increase the sealing effect at such cylinders, respectively, to prevent loss or leakage, and in which the effect of intake or suction strokes tending to unseal such means is neutralized or offset, so that in all positions and under all conditions of motor operation an effective seal is maintained for the valve member and the motor cylinders.

Another object of the invention is to provide a design and arrangement of sealing means for rotary valve mechanisms for an internal combustion motor, in which independent sealing units are provided for the rotary valve shaft or member at each cylinder of the motor so as to maintain an effective seal for each cylinder under the particular conditions there encountered, irrespective of the conditions at other cylinders and which sealing units are interchangeable for ease of assembly and disassembly, as well as to reduce cost of manufacture.

Another object of the invention resides in the provision of a sealing unit for a rotary valve member or shaft of an internal combustion motor, which is formed with resilient pressure means for continuously automatically maintaining the unit in sealing relation with the valve shaft or member, and in which provision is made for utilizing cylinder compression for increasing the sealing effect of the unit on compression strokes, in addition to the action of the continuously acting resilient pressure means.

A further object of the invention is to provide an improved and efficient arrangement and formation of the intake and exhaust passages or ports in and through the rotary valve member or shaft, so that only a single port is required for both intake and exhaust in each cylinder, as well as a single passage through each sealing unit for cooperation therewith, and by which arrangement of value member passages the number of sealing units required in multiple cylinder motors can be reduced through the utilization of a single sealing unit through which the intake can be supplied to the valve member for either of a pair of cylinders, and a single sealing unit through which the exhaust from either of a pair of cylinders can be received from and through the valve member.

A further object of the invention is to so design the inlet and exhaust passages through and in the valve member that on the intake strokes the cylinder ports are gradually opened and quickly or abruptly closed while on the exhaust strokes the cylinder ports are abruptly or quickly opened and gradually closed, so as to obtain the proper fuel charges on the intake strokes and complete discharge and scavenging of the cylinders on exhaust strokes, with resulting material increase in the general efficiency of a motor.

Another object of the invention is to provide for the positive and efficient lubrication of the rotary valve member or shaft with its bearings, and for the sealing means, through the medium of a force feed lubrication system by which lubricant is supplied in the proper quantities and continuously to all bearing and friction surfaces of the valve member.

Another object of the invention resides in the provision of a water jacketed casing or housing for the rotary valve member and the sealing means to maintain the same at the proper temperature for efficient operation.

A further object of the invention is to provide a rotary valve mechanism adapted for any and all types of internal combustion motors, which mechanism will be quiet and efficient at all motor speeds, durable in operation and use, readily accessible for repair or replacement of parts, and of a design and construction capable of ready manufacture at low cost.

With the foregoing general objects, and certain other aims and objects in view which will be readily apparent from the following explanation, the invention consists in certain novel features in construction, and in combinations and arrangements of parts, as will be more fully and particularly referred to and specified hereinafter.

Referring to the accompanying drawings, in which similar reference characters refer to corresponding parts throughout the several figures thereof:

Fig. 1, is a view in perspective and more or less diagrammatical, of an internal combustion motor with a rotary valve mechanism embodying features of the invention mounted thereon and incorporated therein.

Fig. 2, is a vertical longitudinal section through the cylinders and head of the motor of Fig. 1, and showing the rotary valve member or shaft with the sealing units therefor, among other parts, in side elevation, and the water jacketed casing or housing for the valve mechanism in vertical section.

Fig. 3, is a view in top plan of the motor with the upper section of the valve casing and the rotary valve member or shaft removed, and showing particularly the sealing units on the motor cylinders with the lubricating system for the sealing units and valve member bearings.

Fig. 4, is a detail vertical section through a portion of the valve mechanism and a cylinder head, showing the position of an intake passage of the valve member in position between and registered with the inner and outer sealing units for supplying a fuel charge to the cylinder, the sealing units being shown in vertical section.

Fig. 5, is a detail transverse section through the valve member and a portion of a sealing unit to show a valve member passage in registration and operative communication with the sealing unit.

Fig. 6, is a detail perspective view of the driven end portion of the rotary valve member or shaft showing the relative arrangement of exhaust and intake passages therein and therethrough.

Fig. 7, is a perspective view of one of the valve member sealing units, showing the arrangement of oil feed ducts therein and the mounting of the pressure spring on and between the relatively movable sleeves forming the unit.

A mechanical embodiment of the invention is disclosed in the accompanying drawings as mounted on and incorporated with an internal combustion motor of the two-cylinder valve-in-head type, but this embodiment and the type of motor diagrammatically shown, are purely by way of example and not of limitation, for purposes of explaining and bringing forth the principles and various features of the invention. The invention is adapted to use on and with any type and design of motor having a single, or any number of cylinders, and is capable of any desired or called for mechanical form and arrangement to meet the design, constructional and operating requirements of the particular motor with which it is used, as will be clear to those familiar with internal combustion motors.

In the example hereof, referring now to Figs. 1 and 2 of the drawings in particular, an internal combustion motor M, including the usual crank case C, crankshaft S, and water jacketed cylinders A and B, having the pistons A' and B' therein (see Fig. 2), is shown. Each of the cylinders A and B of motor M is provided or formed with a port 10 through the head thereof, in the present instance centrally of the cylinder, and a water jacketed valve casing or housing formed of the horizontal, longitudinally separable upper and lower sections 11 and 12, is disposed over and across the cylinder heads, with the lower section 12 formed with wells or openings therein and therethrough around and of greater diameter than the cylinder ports 10. The upper and lower valve casing sections 11 and 12 are formed separable by means of the bolted flanges 14 extending therearound, so that the upper section 11 can be readily detached and lifted from the lower section 12 for access to the interior of the casing and the valve mechanism therein, which will be described hereinafter. Although not so limited, the cylinder water jacket and that of the casing, 11—12, are in communication, with the cooled water or return flow pipe 15 discharging into the cylinder jacket at a side of motor M, and the heated water or offtake pipe 16 located at and receiving water from one end of the upper casing section 11, pipes 15 and 16 being coupled with any suitable radiator (not shown) or the like in the usual manner.

According to the invention, a rotary valve member or shaft 20 is mounted and enclosed within the casing 11—12 disposed longitudinally thereof over and across the cylinders A and B, for rotation on and around a horizontal axis, as will be particularly clear by reference to Fig. 2 of the drawings. The valve member or shaft 20 is of the solid type and is journalled in any suitable or desired main bearings 21 disposed at and adjacent the ends thereof, and at intermediate portions thereof, respectively, the intermediate bearings preferably being of the thrust type to care for end play or thrust in shaft 20. The interior of the upper and lower casing sections 11 and 12, is formed and designed to fit closely over and around the valve shaft 20, but without contact or engagement therewith, so as to form and provide an enclosing water jacket for cooling and maintaining the valve member or shaft at the proper temperatures during operation, while permitting free rotation of the shaft in the main bearings 21.

The rotary valve shaft 20, is driven or rotated by and in timed relation with the motor M, in the present instance although not so limited, from the forward end of the motor crankshaft. In the example hereof a stub shaft 22, referring now to Figs. 1 and 2 of the drawings, is provided extending from the forward end of valve shaft 20, outwardly a distance through suitable bearings in the casing sections 11—12. A pinion 23 is fixed on the outer end of stub shaft 22, in mesh with a pinion 24 fixed on a vertically disposed shaft 25 carried by and journalled in bearings 26 mounted on motor M. The shaft 25 extends downwardly to the forwardly extended end of the motor crankshaft S and is provided with a pinion 27 in operative mesh with a pinion 28 on the crankshaft (see Fig. 1). Thus, through the foregoing arrangement, the rotary valve shaft or member 20 is rotated or driven by and from the motor crankshaft in timed relation therewith as determined by the ratios of the sets of meshed gears or pinions 23—24, and 27—28, which in the present example give a 2 to 1 rotation of the valve shaft, as will be brought out in the following description.

The upper valve housing or casing section 11 carries and has the intake manifold 30 and the exhaust manifold 31, for the motor M, mounted thereon. In carrying out the invention on a two cylinder motor, as shown herewith by way of example, the upper valve casing section is provided with a series of three openings downwardly therethrough at and adjacent opposite ends of the valve shaft and at an intermediate or central point with respect thereto, which openings are completely covered by the valve shaft (see Fig. 2). Preferably the intake and exhaust manifolds 30 and 31 are cast or otherwise formed integral with the exhaust manifold 31 extending over and along the casing section 11 and the intake manifold crossing and extending around and heated from the exhaust manifold at and above the intermediate opening through casing section 11. The exhaust manifold 31 is connected or coupled with the opposite end openings through casing section 11, in communication therewith, respectively, through the branch pipes 31ª, while the intake manifold 30 is connected and in communication with the intermediate casing section opening by the end pipe 30ª. The foregoing arrangement and mounting of the intake and exhaust manifolds will be clear by reference to Figs. 1 and 2 of the drawings, but it is to be understood that the invention is not limited or restricted to any particular design, construction or arrangement of these manifolds, as various other constructions and arrangements can be utilized.

With the valve member or shaft 20 so mounted and disposed it is necessary to seal the same to prevent leakage of compression from cylinders A and B through ports 10, as well as against entry of oil to the cylinders or to the intake and exhaust manifolds 30 and 31. The invention provides for such sealing as one of its main features, and presents herewith a mechanical expression thereof in the form of a series of units 40, mounted and disposed in the openings previously referred to as extending through the upper and lower casing sections 11 and 12, respectively, these sealing units 40, referring now to Figs. 4 and 7 of the accompanying drawings in particular, are similar and interchangeable, and each includes a fixed sleeve 41 having a base forming flange 42 at one end, and valve member engaging and sealing sleeve 43, slidably fitting over and receiving the sleeve 41 at the end thereof opposite base 42. Valve sleeve 43 is formed with a concave outer end face 44 to closely fit against and receive the valve member or shaft 20, as will be later explained and a reduced area port 45 is formed centrally through face 44, in the example hereof being rectangular in outline or shape, although not so limited.

A coiled expansion spring 46 is mounted over and around the fixed sleeve 41, between the base 42 thereof and the inner end of the valve sealing sleeve 43 slidably mounted on and over sleeve 41, and this spring normally tends to force the valve sleeve 43 outwardly on the sleeve 41, as will be readily understood. By the design and arrangement of these relatively movable sleeves 41 and 43, a chamber 47 is formed between the end of sleeve 41 and the end wall of the movable valve sleeve 43 (see Fig. 4). The end of sleeve 41 is beveled at 48 inwardly, for a purpose appearing hereinafter, while a set of compression or sealing rings 49 are mounted in and around the exterior of sleeve 41 adjacent the end thereof, in engagement with the inner face or wall of valve sleeve 43, so as to form a sliding leakproof fit and seal between fixed sleeve 41 and the movable valve engaging sleeve 43. Similar rings 50 are mounted in and around the exterior of the movable sleeve 43 to serve a sealing function for this movable sleeve in mounted position, as will be referred to hereinafter.

In order to lubricate the contact or engaging face 44 of the valve seal 43 and the portion of the rotary valve shaft in engagement therewith, a series of oil ducts 51 are formed transversely through the end wall of sleeve 43, passing at opposite sides of port 45, and terminating in openings 53 at opposite sides of the sleeve. A series of oil feed openings 52 are formed through the valve engaging face 44 at opposite sides of port 45, through which oil is supplied from ducts 51 to the sleeve face and portion of the valve shaft engaged thereby and in contact therewith. The opposite side oil openings 53 are for registration or coupling with an oil supply duct to permit of flow and circulation of oil therefrom and through sleeve ducts 51, as will be further explained.

A sealing unit 40, constructed as above described, is mounted in each of the openings through the lower valve casing section 12, over and around a cylinder port 10, with the fixed sleeve 41 secured in any suitable or desired manner to the cylinder head by base 42, and the movable sealing sleeve 43 fitting and forced against the valve member or shaft 20 by the action of the expansion spring 46, the shaft 20 fitting into and received by the concave face 44 of movable sleeve 43 with a sealing fit. In the present example, an annular filler member or ring 54 is fitted and secured into each casing section opening around unit 40 therein with the movable valve seal 43 in engagement and forming a sliding fit therewith, the rings 50 around sleeve 43 engaging filler member 54 and forming a leak proof, slidable fit therewith, so that the valve sleeve 43 can move freely longitudinally thereof. The rings 50 are of the split expansion type and perform a farther function of taking up radial or lateral movement or play developed by sleeve 43 in member 54 through wear or otherwise, to thus insure a leakproof fit between member 54 and the movable sleeve 43. In mounted position, the sealing units 40 at the lower or cylinder side of valve shaft 20 form and provide passages through the sleeves forming the same, from the ports 10 to the valve shaft 20, while the rings 49 on the fixed sleeves 41 provide a leakproof sliding fit between the sleeves, as well as caring for radial or lateral play or movement therebetween.

A series of the sealing units 40 are mounted in a generally similar manner to that above described, in the openings through the upper casing section 11, in communication with the intake and exhaust manifolds 30 and 31, respectively. In the mounting of the sealing units 40 in casing section 11, the fixed sleeves 41 are secured by their bases 42 on the outer ends of the casing openings with the sleeves extending or depending downwardly therethrough, and the movable valve shaft sleeves 43 thereon at the inner ends thereof bearing and forced against the valve shaft 20 by the springs 46, to maintain a sliding sealing fit with the valve shaft. In the particular construction here shown the openings through the upper section 11 of the valve casing are of a diameter such that the movable valve shaft sleeves 43 and rings 50 therearound engage the inner walls thereof to form a sliding leakproof fit therewith, as will be clear by reference to Figs. 2 and 4 of the drawings. Thus, in mounted position of the sealing units 40 in the valve casing, the exhaust manifold 31 is coupled to the fixed sleeves 41 in communication with the passages formed through units 40, by the branch pipes 31ª located adjacent the ends of the valve casing and valve shaft therein, while the intermediate or central sealing unit 40 is coupled and in communication with the intake manifold 30 through outlet pipe 30ª (see Fig. 2). The passages through the upper sealing units form continuations of the exhaust manifold to points adjacent opposite ends of the valve shaft, and of the intake manifold to a point intermediate, or centrally of the valve shaft, respectively. It will here be noted that by the arrangement of the valve casing sections 11—12, the valve shaft sealing units 40 in mounted position are completely water jacketed by the valve casing sections, and are thereby maintained at the necessary temperatures in operation of the motor, to prevent warping or other effects of destructively high temperatures on these units.

The rotary valve member or shaft 20 is provided with a series of intake and exhaust passages therethrough for cooperation with the upper and lower sets of sealing units 40 and the passages therethrough, and the arrangement and form of the passages in the valve member 20 provides another main feature of the invention. With the motor M of the two cylinder, four cycle type, the valve shaft 20 is formed with a pair of exhaust passages 61 and 62, and a pair of intake passages 63 and 64. The valve exhaust passages 61 and 62 extend through the valve member 20 at and adjacent the opposite ends thereof, referring now to Fig. 2, in particular, while the intake passages 63 and 64 are disposed spaced apart between or intermediate these exhaust passages. Exhaust passage 61 is disposed or inclined at an angle to the longitudinal axis of the valve member 20 with its opposite ends opening through the member at points thereon disposed within the vertical planes through the ports 45 of the sleeves 43 of the lower seal unit 40 at port 10 of cylinder A, and the upper seal unit 40 at the forward end 31ª of exhaust manifold 31, respectively. The exhaust passage 62 of the valve member 20 is similarly disposed but inclined in the opposite direction from passage 61, so that its opposite end ports or openings lie in the vertical planes of the ports 45 of lower seal unit 40 for cylinder B, and the upper seal unit 40 in communication with the rear exhaust manifold pipe 31ª, respectively.

The intake passages 63 and 64 are formed extending through the valve member or shaft 20 at substantially right angles or 90 degrees with respect to each other and are inclined in opposite directions to the longitudinal axis of the shaft 20, but have their adjacent end openings through the shaft in the vertical plane of the port 45 of the upper sealing unit 40 which is coupled to the intake manifold 30, while their opposite end openings are disposed on the valve shaft to be within the vertical planes through the ports 45 of the units 40 for cylinders A and B, respectively, that is, in the same transverse plane of the shaft as the adjacent ends of exhaust passages 61 and 62, respectively. The intake passage 63 of the valve shaft 20 supplies fuel charges from the intake manifold 30 through upper intermediate sealing unit 40, to cylinder A, and the intake passage 64 supplies fuel to cylinder B from manifold 30 through the same unit 40. Each intake passage 63 and 64 places the intake manifold in communication with the respective cylinder port 10 once in every revolution of shaft 20, but these passages being disposed 90 degrees apart around the shaft, such action is alternate, first one cylinder intaking and then the other. By the foregoing arrangement of intake passages, the intake for the pair of cylinders A and B can be performed by the use of a single upper sealing unit 40 connected with intake manifold 30, such unit 40 serving both cylinders A and B, alternately through intake passages 63—64.

The exhaust passages 61 and 62, and the intake passages 63 and 64 are all rectangular in cross section to accord with the shape of the ports 45 in the valve sleeves 43, with which the valve passages are registered and placed in communication, although the invention is not limited to either the shape of ports 45 or of the valve intake and exhaust passages. In order to increase the efficiency of the motor the ends of the intake passages 63 and 64 which register with the ports 45 of the sealing units communicating with cylinder ports 10 are enlarged and beveled or inclined inwardly at 63' and 64', respectively, on the advancing sides thereof so as to gradually open the same on the intake strokes of the motor. The ends of the exhaust passages 61 and 62 which register with the ports 45 of the lower sealing units 40 at the cylinder ports 10, are enlarged or beveled in a similar manner, but at the trailing or rear sides thereof, so that ports 10 and these passages are gradually closed on exhaust strokes to permit of complete discharge of the burned gases and thorough scavenging of the motor cylinders.

The intake and exhaust passages for each cylinder A and B of the motor M, are properly located at the required distance or number of degrees apart around the valve shaft or member 20, and each set of exhaust passage and intake passage for each cylinder is properly relatively located around the valve shaft with respect to the other set of cylinder passages, so as to obtain a four cycle operation of motor M, as will be readily understood. As an example, in one cycle of operation of motor M, starting with the pistons A' and B' in the positions of Fig. 2, that is cylinder A in position for firing a compressed fuel charge, and cylinder B with piston B' at the end of its intake stroke, the valve shaft 20 is rotated to a position closing port 10 and the sealing unit 40 therefor, as well as the upper unit 40 coupled with the exhaust manifold 31, but with the intake passage 64 in position registered at its opposite ends with the port 10 of cylinder B and the upper intake sealing unit 40, respectively, for flow of fuel from the intake manifold 30 to cylinder B. Upon firing of the charge in cylinder A, piston A' is forced downwardly and valve shaft 20 is rotated through its driving mechanism to move passage 64 from communication with port 10 of cylinder B to close this cylinder and permit upwardly moving piston B' to compress the fuel charge. As piston A' finishes its power stroke and starts upwardly on its exhaust stroke, the valve shaft 20 has rotated to place exhaust passage 61 in communication with and between port 10 of cylinder A and the passage of upper sealing unit 40 coupled to the forward end of exhaust manifold 31, the valve shaft maintaining cylinder B closed in which the firing or power stroke is taking place. After the exhaust stroke of cylinder A, the valve shaft rotates and passage 63 is brought into position placing the upper sealing unit 40 of the intake manifold into communication with cylinder A through the port 10, and on intake stroke of piston A' a fuel charge is drawn into the motor, cylinder B exhausting through passage 62 which has been rotated to position opening cylinder B through port 10 to the exhaust manifold. Cylinder piston A' then moves upwardly on its compression stroke to firing position, the valve shaft having rotated to position closing the cylinder, while cylinder B has been closed and intake passage 64 rotated with the valve shaft 20 to position for intake of a fuel charge, thus completing the cycle.

The valve member or shaft sealing units 40, both upper and lower, are maintained in sealing position against shaft 20 at all times by the action of the expansion springs 46 which force the movable sleeves 43 into constant sealing contact with the valve shaft. Due to the formation of the chambers 47 in and between the sleeves 41 and 43 of the units 40, on compression strokes of the cylinder pistons A' and B', pressures are established in these chambers of the lower sealing units which are incommunication with cylinder ports 10, with the result that the movable sleeves 43 are forced by these pressures into tighter sealing engagement with the valve shaft thus insuring against leakage and loss of compression. This action is aided and the pressures properly directed to the movable sleeves 43 by the bevel 48 at the upper ends of fixed sleeves 41, and is in addition to and in aid of the continuous pressures exerted by springs 46. In a lesser degree of course this action takes place on exhaust strokes in the lower sealing units, while the construction is such that the outwardly acting pressures on exhaust strokes through the exhaust passages of the upper sealing units will not force sleeves 43 from sealing contact but if any action takes place will tend to force sleeves 43 into tighter sealing engagement, due to the chambers 47. Similarly, on intake strokes the effect on movable sleeves 43 will be to force them into tighter sealing contact with the valve shaft, or at least to neutralize any tendency to weaken the pressures exerted by springs 46.

A system for lubricating the main bearings 21 and upper and lower valve shaft engaging sleeves 43 of the sealing units 40, is provided, and is diagrammatically indicated in Fig. 3 of the accompanying drawings. This system includes an oil inlet line 70 at one end of the valve shaft casing 11—12, which is supplied continuously with oil under pressure by a pump (not shown) or other suitable means. The line 70 is connected into a series of oil ducts or passages 71 which are coupled together in series and extend from intake line 70 through the adjacent main bearing 21, to and through passages or ducts 51 of sealing sleeve 43, then through the intermediate main bearings 21, to the next sealing unit sleeve 43, through the forward end main bearing 21, and then outwardly to a return flow oil line 72. Oil flowing through the ducts 51 of sleeves 43 is fed to the contact faces 44 of the sleeves by ports or openings 52. Attention is here directed to the position of the oil feed ports 52 disposed in lines at opposite sides of the ports 45 of sleeves 43 in the line of rotation or transversely of shaft 20, so that the oil fed onto shaft 20 is not carried over and across the ports 45 and mixture thereof with incoming fuel on registration of valve shaft intake passages 63 and 64, or dissipation of oil outwardly through the exhaust strokes, is practically eliminated. This action is materially aided by the formation of the shoulder edges 44' at opposite sides of the concave shaft receiving faces 44 of movable sleeves 43, which edges act and function as wipers to prevent passage of sufficient oil across ports 45 to be objectionable (see Fig. 7).

The rotary valve mechanism and sealing means therefor, constructed and mounted as above described and explained, provides an efficient motor operation and permits of high compression in and high speed by the motor without noise and with full utilization of the many advantages of the rotary type of valve. The valve mechanism is efficiently cooled by the jacketed casing formed of the upper and lower sections 11 and 12, and by removing the upper section 11, full access can be had to the rotary valve member 20 and sealing units 40. The use of independent sealing units eliminates possibility of binding, freezing or sticking of the valve shaft due to unequal expansion and contraction thereof and therealong, while the employement of simliar and interchangeable sealing units reduces manufacturing costs and materially lowers upkeep and replacement difficulties.

Preferably, as permitted by the arrangement of the motor head and casing 11—12, spark plugs P, as shown by Figs. 1 and 2 are mounted through the sides of the cylinders A and B at the upper ends thereof at an angle of approximately 45 degrees, although not so limited, to secure more efficient firing of the fuel charges in the combustion chambers, as will be clear to those familiar with internal combustion motors. The provision of the sealing units 40 at upper and lower (inner and outer) sides of the valve member or shaft 20, insures and provides against possibility of leakage and enables the use of high compression in the motor. The use of the expansion rings 49 between relatively movable sleeves 41 and 43 and adjacent bearing or engaging walls, provides and forms a positive leakproof ring seal in and for the sealing units 40 at the upper and lower (inner and outer) sides of the rotary valve shaft or member 20, so as that leakage between, from or through the units is eliminated.

Obviously, rotary valve mechanism of the invention is adapted for use with single cylinder motors or multiple cylinder, and in the latter the principle and arrangements disclosed in the example hereof are merely multiplied in accordance with the number of cylinders.

It is also evident that various changes, modifications, variations and substitutions might be resorted to without departing from the spirit and scope of my invention, and hence I do not desire to limit myself to the exact and specific disclosures hereof.

What I claim is:

1. A sealing unit for a rotary valve shaft, embodying a fixed sleeve member, and a movable sleeve member slidably mounted thereon for sealing engagement with a valve shaft, said sleeve members forming a passage therethrough to the valve shaft.

2. A sealing unit for a rotary valve shaft, embodying a fixed sleeve member, a movable sleeve member slidably mounted thereon for sealing engagement with a valve shaft, and means for continuously forcing said movable sleeve member into sealing engagement with the valve shaft.

3. A sealing unit for a rotary valve shaft, embodying a fixed sleeve member, a movable sleeve member slidably and telescopically fitting over said fixed member, a coiled expansion spring around said fixed member exerting continuous pressure on and forcing said movable member outwardly, said movable member formed with a valve shaft engaging end wall having a port therethrough, said sleeve members forming a passage through the unit and the space between the movable member end wall and the inner end of the fixed sleeve member providing a pressure chamber.

4. In combination with an internal combustion motor and a cylinder thereof having a port therethrough, a rotary valve mechanism for the motor including a rotary valve shaft having intake and exhaust passages therethrough, a sealing unit between the motor cylinder port and said shaft providing a passage from the cylinder port to the shaft for alternate registration with said shaft passages, the said unit embodying a fixed sleeve member, a movable sleeve member slidably mounted on the fixed sleeve and in continuous sealing contact with said shaft, sealing means between said sleeve members, and the said sleeve members formed with an internal chamber in communication with the passage therethrough, whereby the compression stroke in the cylinder creates pressures acting on the movable sleeve member forcing the same against the valve shaft.

Signed at Oxford, North Carolina, this 31 day of May, 1927.

JAS. E. HULSE.